United States Patent
Birse et al.

(10) Patent No.: US 7,089,300 B1
(45) Date of Patent: *Aug. 8, 2006

(54) METHOD AND APPARATUS FOR ADMINISTERING THE OPERATING SYSTEM OF A NET-BOOTED ENVIRONMENT

(75) Inventors: Cameron Stuart Birse, San Jose, CA (US); Keith Stattenfield, Santa Clara, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/420,503

(22) Filed: Oct. 18, 1999

(51) Int. Cl.
*G06F 15/177* (2006.01)

(52) U.S. Cl. ...................... 709/221; 709/222

(58) Field of Classification Search .............. 709/217, 709/221, 203, 245, 108, 332, 229, 222, 226, 709/223; 713/1, 2, 100, 200; 717/11, 178, 717/177, 9, 173, 170; 707/217, 221, 203, 707/245, 104; 710/302; 345/346; 714/4, 714/15; 711/112, 173
See application file for complete search history.

(56) References Cited

U.S. PATENT DOCUMENTS

| | | | | |
|---|---|---|---|---|
| 4,747,040 A | * | 5/1988 | Blanset et al. ............... | 709/108 |
| 5,146,568 A | | 9/1992 | Flaherty et al. .............. | 395/325 |
| 5,257,378 A | | 10/1993 | Sideserf et al. .............. | 395/700 |
| 5,280,627 A | | 1/1994 | Flaherty et al. | |
| 5,325,529 A | | 6/1994 | Brown et al. | |
| 5,339,430 A | * | 8/1994 | Lundin et al. ............... | 709/332 |
| 5,452,454 A | | 9/1995 | Basu | |
| 5,483,647 A | * | 1/1996 | Yu et al. ...................... | 713/100 |
| 5,603,011 A | | 2/1997 | Piazza | |
| 5,666,293 A | * | 9/1997 | Metz et al. .................. | 709/220 |
| 5,724,530 A | | 3/1998 | Stein et al. .................. | 395/329 |
| 5,742,829 A | * | 4/1998 | Davis et al. ................. | 717/178 |
| 5,758,165 A | * | 5/1998 | Shuff ........................... | 717/178 |
| 5,764,992 A | * | 6/1998 | Kullick et al. .............. | 717/170 |
| 5,802,297 A | * | 9/1998 | Engquist ..................... | 709/212 |
| 5,842,011 A | * | 11/1998 | Basu ............................. | 713/2 |
| 5,859,978 A | | 1/1999 | Sonderegger et al. | |
| 5,918,048 A | * | 6/1999 | Mealey et al. ................ | 713/2 |
| 5,926,631 A | | 7/1999 | McGarvey ................... | 395/500 |
| 5,948,101 A | | 9/1999 | David et al. | |
| 5,968,170 A | * | 10/1999 | Gross et al. ................... | 713/1 |
| 5,974,547 A | * | 10/1999 | Klimenko ....................... | 713/2 |
| 6,006,034 A | * | 12/1999 | Heath et al. ................. | 717/170 |
| 6,009,274 A | * | 12/1999 | Fletcher et al. ............. | 395/712 |
| 6,016,400 A | * | 1/2000 | Day et al. ....................... | 713/2 |

(Continued)

OTHER PUBLICATIONS

Chuang et al, A Case Study of Secure ATM Switch Booting, IEEE 1996.*

(Continued)

*Primary Examiner*—Thong H Vu
(74) *Attorney, Agent, or Firm*—Blakely, Sokoloff, Taylor & Zafman LLP

(57) ABSTRACT

A method and apparatus are provided for supplying a reliable and maintainable operating system in a net-booted environment. According to one embodiment, a network computer (NC) system including an NC server and multiple NC clients is managed by an NC client causing the remainder of the NC clients that are subsequently booted to receive operating system software that is configured differently than that currently in effect by replacing one or more system volumes on the NC server containing the operating system software with one or more different system volumes.

21 Claims, 11 Drawing Sheets

U.S. PATENT DOCUMENTS

| | | | | |
|---|---|---|---|---|
| 6,016,402 | A | 1/2000 | Thomas et al. | |
| 6,066,182 | A | 5/2000 | Wilde et al. | |
| 6,067,618 | A | 5/2000 | Weber | |
| 6,128,734 | A * | 10/2000 | Gross et al. | 713/100 |
| 6,130,668 | A | 10/2000 | Stein | |
| 6,134,614 | A * | 10/2000 | Chari et al. | 710/302 |
| 6,161,176 | A | 12/2000 | Hunter et al. | |
| 6,163,853 | A * | 12/2000 | Findlay et al. | 714/4 |
| 6,170,008 | B1 | 1/2001 | Bahlmann et al. | |
| 6,175,917 | B1 | 1/2001 | Arrow et al. | |
| 6,175,918 | B1 | 1/2001 | Shimizu | |
| 6,178,503 | B1 * | 1/2001 | Madden et al. | 713/2 |
| 6,185,678 | B1 | 2/2001 | Arbaugh et al. | |
| 6,199,204 | B1 * | 3/2001 | Donohue | 717/11 |
| 6,202,091 | B1 | 3/2001 | Godse | |
| 6,204,847 | B1 * | 3/2001 | Wright | 345/346 |
| 6,205,473 | B1 * | 3/2001 | Thomasson et al. | 709/217 |
| 6,209,031 | B1 * | 3/2001 | Casey et al. | 709/222 |
| 6,209,089 | B1 * | 3/2001 | Selitrennikoff et al. | 713/2 |
| 6,253,209 | B1 * | 6/2001 | Chase-Salerno et al. | 707/104 |
| 6,260,068 | B1 * | 7/2001 | Zalewski et al. | 709/226 |
| 6,266,809 | B1 * | 7/2001 | Craig et al. | 717/173 |
| 6,269,396 | B1 * | 7/2001 | Shah et al. | 709/223 |
| 6,279,030 | B1 * | 8/2001 | Britton et al. | 709/203 |
| 6,279,109 | B1 * | 8/2001 | Brundridge | 713/2 |
| 6,292,941 | B1 * | 9/2001 | Jollands | 717/11 |
| 6,314,438 | B1 | 11/2001 | Stein et al. | |
| 6,317,826 | B1 * | 11/2001 | McCall et al. | 713/1 |
| 6,330,653 | B1 * | 12/2001 | Murray et al. | 711/173 |
| 6,330,715 | B1 * | 12/2001 | Razzaghe-Ashrafi | 717/11 |
| 6,334,149 | B1 | 12/2001 | Davis, Jr. et al. | |
| 6,345,294 | B1 | 2/2002 | O'Toole et al. | |
| 6,345,309 | B1 * | 2/2002 | Ohsawa et al. | 709/250 |
| 6,357,040 | B1 * | 3/2002 | POrter | 717/9 |
| 6,374,363 | B1 | 4/2002 | Wu et al. | |
| 6,401,093 | B1 | 6/2002 | Anand et al. | |
| 6,421,777 | B1 * | 7/2002 | Pierre-Louis et al. | 713/2 |
| 6,434,695 | B1 | 8/2002 | Esfahani et al. | |
| 6,438,683 | B1 | 8/2002 | Endsley | |
| 6,456,203 | B1 | 9/2002 | Schomaker et al. | |
| 6,466,972 | B1 | 10/2002 | Paul et al. | |
| 6,477,642 | B1 | 11/2002 | Lupo | |
| 6,487,601 | B1 * | 11/2002 | Hubacher et al. | 709/229 |
| 6,490,677 | B1 * | 12/2002 | Aguilar et al. | 713/1 |
| 6,513,061 | B1 | 1/2003 | Ebata et al. | |
| 6,519,633 | B1 | 2/2003 | Kubik et al. | |
| 6,529,948 | B1 | 3/2003 | Bowman-Amuah | |
| 6,535,976 | B1 | 3/2003 | Hoggarth et al. | |
| 6,543,004 | B1 * | 4/2003 | Cagle et al. | 714/15 |
| 6,564,232 | B1 * | 5/2003 | Cole et al. | 707/203 |
| 6,578,069 | B1 * | 6/2003 | Hopmann et al. | 709/203 |
| 6,611,915 | B1 * | 8/2003 | Kubik et al. | 713/200 |
| 6,625,754 | B1 * | 9/2003 | Aguilar et al. | 714/15 |
| 6,631,442 | B1 * | 10/2003 | Blumenau | 711/112 |
| 6,633,916 | B1 * | 10/2003 | Kauffman | 709/229 |
| 6,718,549 | B1 * | 4/2004 | Narin et al. | 717/178 |
| 6,751,658 | B1 * | 6/2004 | Haun et al. | 709/222 |

OTHER PUBLICATIONS

Hobbs et al, Booting of the RHODOS Distributed Operating System, http://citeseer.nj.nec.com/hobbs92booting.html.*

Bootstrap Tests: How Many Bootstraps?—Davidson (1997) qed.econ.queensu.ca/pub/faculty/mackinnon/papers/many.ps.*

Bootstrap Tilting Inteference and Large Data Sets—Tim C. Hesterberg (1998) ; www.statsci.com/Hesterberg/NSFTiltingProposal.ps.*

Trap-driven simulation with Tapeworm II—Uhlig, Nagle, Mudge, Sechrest (1994); a system-wide trace buffer [Mogul91]A modified operating system kernel interleaves the execution of the www.eecs.umich.edu/~tnm/papers/asplos94.ps.*

The Jalapeño Dynamic Optimizing Compiler for Java—Burke, Choi, Fink.. (1999) www.mcs.newpaltz.edu/~hind/papers/grande99.ps.*

The Flux OSkit: A Substrate for Kernel and Language Research—Ford (1997) www.cs.utah.edu/~kwright/paper_summs/os_papers/../../papers/oskit-sosp97.ps.*

A Survey of Programmable Networks—Campbell (1999) comet.columbia.edu/mobiware/papers/survey_ccr..ps.gz.*

P.K. Wong, "Remote boot Windows 95a step by step instructions", Downloaded from wpkgate.kc.com.my/remoteboot/win95.text on Oct. 11, 1999, 5 pages.

"Newboot Introduction", Downloaded from www.han.de/~gero/netboot/english/introduction.html on Oct. 11,1999, 13 pages.

Rich Kaszeta, "A New Use for Old Computers", Downloaded from www.menet.umn.edu/'kaszeta/unix/xterminal/index.html on Oct. 11, 1999, 8 pages.

Croft, Bill and Gilmore, John. "Bootstrap Protocol (BOOTP)" Network Working Group RFC 951, Sep. 1985.

Reynolds, L. "BOOTP Vendor Information Extensions" Network Working Group RFC 1395, Jan. 1993.

Wimer, W. "Clarifications and Extensions for the Bootstrap Protocol" Network Working Group, RFC 1532, Oct. 1993.

Alexander, S. "HDCP Options and BOOTP Vendor Extensions" Network Working Group, RFC 2132, Mar. 1997.

Arbaugh, W. A., et al. "A Secure and Reliable Bootstrap Architecture" IEEE Symposium on Security and Privacy, May 4-5, 1997, Pp. 65-71.

Estrin, D. et al. "A Dynamic Bootstrap Mechanism for Rendezvous-Based Multicast Routing" IEEE INFOCOM '99. Eighteenth Annual Joint Conference of the IEEE Computer and Communications Societies. vol. 3, Mar. 21-25, 1999, Pp. 1090-1098.

"Device Configuration Assistant Design Overview" Sun Microsystems, 1999.

Ford, Bryan et al. "The Flux OS Toolkit: Reusable Components for OS Implementation" IEEE 1997. Pp. 14-19.

* cited by examiner

METHOD AND APPARATUS FOR ADMINISTERING THE OPERATING SYSTEM OF A NET-BOOTED ENVIRONMENT

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The invention relates generally to network computing. More particularly, the invention relates to the provision, administration, and maintenance of an operating system in a net-booted environment.

2. Description of the Related Art

Most organizations currently employ local area networks (LANs) of thick clients, e.g., personal computers. While this represents an improvement over the disconnected computing environments of a decade earlier, many limitations still exist. In current LAN environments, each client computer has its own local copy of operating system software, application programs, and user customizations to the desktop environment. Typically there is no centralized mechanism for maintaining a consistent system configuration in such a computing environment. Consequently, individual user workstations often get out-of-sync with each other as one or more users upgrade to newer versions of the operating system, upgrade their application programs, or install application programs that were not part of the original system configuration. Additionally, in this type of uncontrolled, decentralized environment, the operating system of a client computer can easily become corrupted. This is especially true with the Microsoft® Windows® 95, 98 and NT operating systems where user modification of a single system file can have undesirable consequences and require significant downtime. For example, editing the Windows Registry file could render a client computer unusable thereby requiring reinstallation of the computer's operating system software and all the application programs.

In view of the foregoing, it should be apparent that administration and maintenance of current computing environments is complex and time consuming. Therefore, what is needed is a reliable computing environment that can be maintained more easily and at a lower cost.

BRIEF SUMMARY OF THE INVENTION

A method and apparatus are described for providing a reliable and maintainable operating system in a net-booted environment. According to one embodiment, a network computer (NC) system including an NC server and multiple NC clients is managed by an NC client causing the remainder of the NC clients that are subsequently booted to receive operating system software that is configured differently than that currently in effect by replacing one or more system volumes on the NC server containing the operating system software with one or more different system volumes.

Other features and advantages of the invention will be apparent from the accompanying drawings and from the detailed description.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
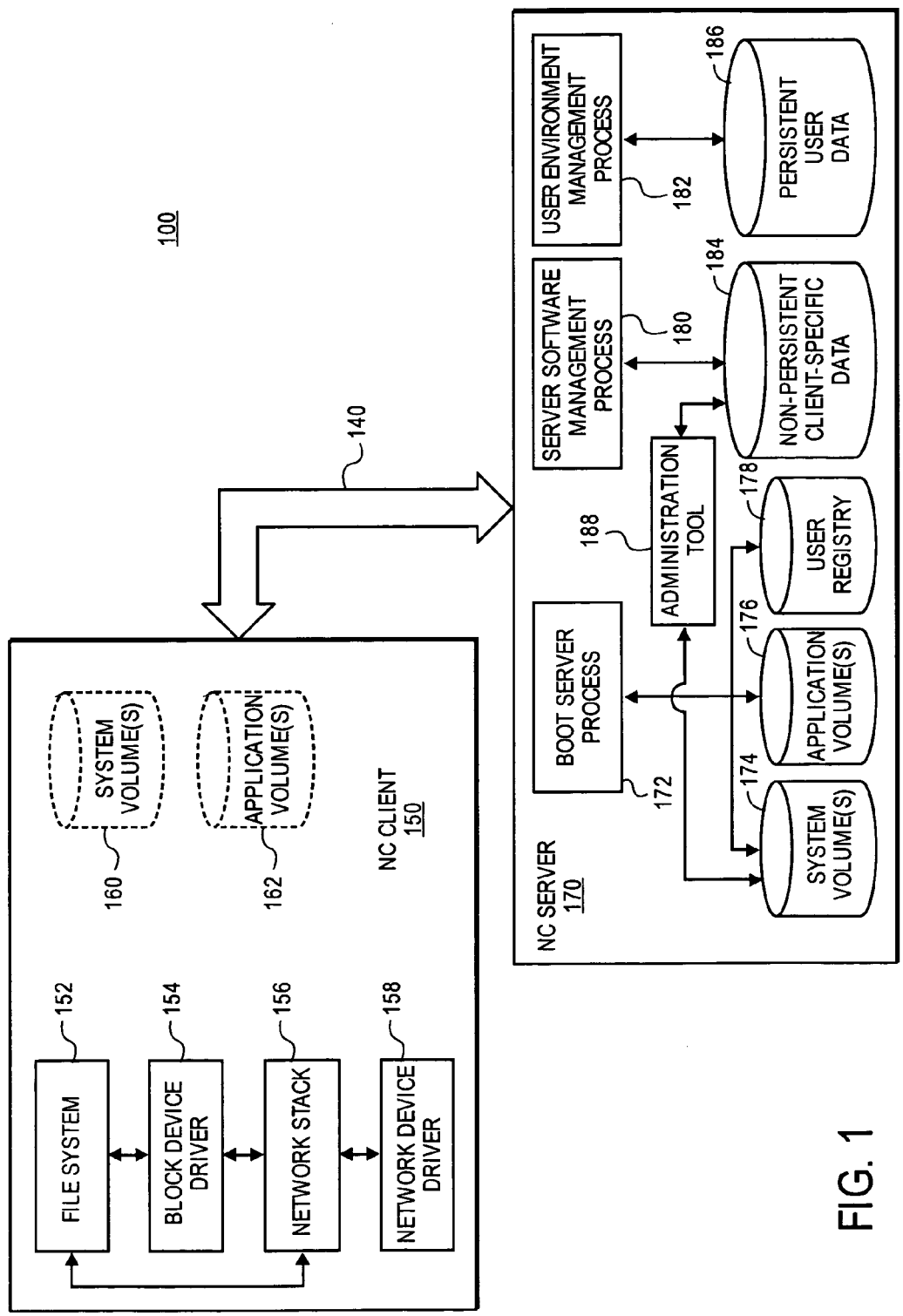
FIG. 1 is a simplified block diagram that conceptually illustrates a network computer system according to one embodiment of the present invention.

A method and apparatus are described for providing a reliable and maintainable operating system in a net-booted environment. Broadly stated, embodiments of the present invention seek to provide a fault-tolerant, self-repairing, and remotely maintainable operating system for the clients in a net-booted environment. According to one embodiment of the present invention, a network computer (NC) system maintains a copy of the operating system that cannot be corrupted by ordinary users of the NC system. Additionally, the NC system may preserve user customizations, such as preferences, by maintaining individual, user, storage areas. When an NC client boots from the network and accesses a stored copy of the operating system from an NC server, the user's preferences are dynamically merged with the system environment provided to the NC client. Advantageously, since, the user's desktop preferences and other customized settings are all preserved from session to session and supplied to the NC client as it boots from the network, the user may login to any NC client on the network and have the same user experience. According to another embodiment, a network administrator can upgrade every NC client in the NC system to a new version of the operating system by simply replacing a single file on the NC server. Further, according to another feature of the present invention, the network administrator can perform such an upgrade remotely from any NC client of the NC system. Advantageously, in this manner, NC system administration and maintenance costs are kept low as compared to a typical network of thick clients that each has a local copy of the operating system that must be replaced.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. The steps of the present invention may be performed by hardware components or may be embodied in machine-executable instructions, which may be used to cause a general-purpose or special-purpose processor or logic circuits programmed with the instructions to perform the steps. Alternatively, the steps may be performed by a combination of hardware and software.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Importantly, while embodiments of the present invention will be described with reference to the Mac® operating system (OS) software and NetBoot technology on a Mac OS X Server, the method and apparatus described herein are equally applicable to other types of servers and operating systems, such as Microsoft® Windows® 95/98, Windows NT, Windows 2000, Windows CE, AIX, UNIX®, Linux, and the like. Consequently, the techniques described herein are thought to be generally useful in connection with remote bootstrapping of client systems in a variety of operating environments and networking environments.

Terminology

Before describing an exemplary environment in which various embodiments of the present invention may be implemented, some terms that will be used throughout this application will briefly be defined.

The terms "boot," "booting," "bootstrap," and "bootstrapping" generally refer to the process of starting-up a computer, which typically involves loading operating system software.

An "image" refers to an electronic representation of an individual disk or a portion thereof.

The term "file system" generally refers to the logical structures and software routines used to control access to and from the storage on a storage medium, such as a hard disk system.

An "operating system" refers to a program that manages a computer's internal functions and provides a means to control the computer's operations and file system. Examples of operating systems include: MacOS, Windows 95/98, Windows NT, Windows 2000, Windows CE, AIX, UNIX, and Linux.

"Personal computer" generally refers to a computer system equipped with system, utility, application software, and/or input/output devices. Importantly, as used herein, the term "personal computer" is intended to refer collectively and individually to stand-alone Macintosh® computers, Apple® computers, IBM® Personal Computers, IBM PC-compatible computers, Amiga computers, and others, such as Commodore that are no longer manufactured and those yet to be manufactured.

The term "thick client" generally refers to a computer system, such as a personal computer (PC), that includes a hard drive or other local storage medium. Traditionally, such computer systems boot and execute application programs from the local storage medium.

A "thin client" generally refers to a disk-less computer system that relies upon external means, such as a server, to supply it with an operating system and application programs.

As used herein, the terms "network computer client" or "NC client" generally refer to a client (thick or thin) that boots by accessing a copy of the operating system over a network. As such, an NC client is not required to be disk-less.

The terms "network computer server" or "NC server" generally refer to a computer system that services requests of NC clients. For example, an NC server may provide access to a copy of the operating system to an NC client in response to a boot request.

A "network computer system" or "NC system" refers to a network including one or more NC clients and one or more NC servers.

In the context of this application, the term "volume" generally refers to a fixed amount of storage on a storage medium, such as a disk or tape. In some instances, however, the term may be used as a synonym for the storage medium itself. However, it is possible for a single storage medium to contain more than one volume or for a volume to span more than one storage medium.

Network Computer System Overview

In order to obtain the benefits of low-cost administration, all storage of application programs and operating system software for an NC system is preferably on the NC server. This doesn't mean the NC clients have no mass storage, but rather that the NC clients boot over the network by accessing a stored copy of the operating system from the NC server. Additionally, when NC clients want to run an application, they access it from the NC server. Advantageously, in this manner, an application may be upgraded by simply replacing the old version of the application with a new version on the NC server. Then, the next time an NC client requests the application, the NC client will receive the new version.

FIG. 1 is a simplified block diagram that conceptually illustrates an NC system 100 according to one embodiment of the present invention. In this example, the NC system 100 includes an NC client 150 coupled to an NC server 170 via a data communication link 140, such as a 10, 100, or 1000 megabit/second Ethernet link. While according to one embodiment, the NC client 150 is a Macintosh computer or iMac™ computer and the NC server 170 is a Mac OS X Server, the NC client 150 and/or the NC server 170 may alternatively represent one or a combination of the devices/systems described below with reference to FIG. 2.

The NC server 170 includes one or more system volumes 174, one or more application volumes 176, a user registry 178, non-persistent client-specific data 184, and persistent user data 186. The system volumes 174 include a protected, read-only, master copy of the operating system software. The application volumes 176 include copies of various application programs for use by the NC client 150. According to one embodiment, the user registry 178 is a database of authorized users, user passwords, NC client hardware addresses, such as Ethernet Media Access Control (MAC) addresses, and NC client network addresses, such as Internet Protocol (IP) addresses. In an AppleTalk network environment or the like, the user registry 178 may comprise the AppleShare Registry. The non-persistent client-specific data 184 represents temporary data storage that is typically preserved only for the duration of a user session on a particular NC client. The persistent user data 186 represents long-term data storage for user information that is desirable to retain between user sessions, such as preferences, browser bookmarks, and other desktop environment customizations.

The NC server 170 also includes a boot server process 172, a server software management process 180, and a user environment process 182, each of which may include hard-wired circuitry or machine-executable instructions or a combination thereof. Furthermore, at least a portion of such hard-wired circuitry and/or machine-executable instructions may be shared between a combination of the boot server process 172, the server software management process 180, and the user environment process 182. In one embodiment, at least one storage area/memory (e.g., a machine-readable medium) having appropriate routines and/or data stored therein coupled to at least one processor is utilized, at least in part, to implement one or a combination of the boot server process 172, the server software management process 180, and the user environment process 182.

According to one embodiment, the boot server process 172 manages access to and from the system volumes 174 and the application volumes 176. Additionally, the boot server process 172 performs server-side bootstrapping processing. In one embodiment, the boot server process 172 may include conventional Bootstrap Protocol (Bootp) server processing that waits for NC clients to appear on the network in accordance with Request For Comments (RFC) 951, Bill Croft, John Gilmore, Bootstrap Protocol, RFC 951, September 1985, RFC 2132, and uses the standard extensions format. As described further below, when the boot server process 172 receives a boot request from the NC client 150, the boot server process 172 may provide the NC client 150 with a network address, such as an Internet Protocol (IP) address, the address of the NC server 170, and the name of a file to be loaded into memory and executed. This first phase of the bootstrapping process is described by RFC 951 as the "address determination and bootfile selection" phase. The second phase of the boot strapping process involves the file transfer of the bootfile (also referred to as a boot image) by way of the Trivial File Transfer Protocol (TFTP), the Simple File Transfer Protocol (SFTP), the File Transfer Protocol (FTP), or the like. Further details regarding the particular information exchanged during these two phases will be described below.

In one embodiment, to facilitate remote NC system administration, such as the installation of new system or application software, the boot server process 172 may serve application and system images that exist in the NC client's folder at the time of bootstrapping as a read-write file. In this manner, a user having proper access privileges on the NC system, such as an NC system administrator, may create a read-write file from any NC client in the NC system, modify the read-write file, and subsequently upgrade the NC system by simply replacing the system and/or application volumes on the NC server with the modified file.

In one embodiment the server software management process 180 manages access to and from the non-persistent client-specific data 184. For example, at the conclusion of a user session on an NC client, the server software management process 180 may provide data that is to be preserved between user sessions to the user environment management process 182 and reinitialize the client-specific storage area associated with the NC client for use by the next user. According to one embodiment, the server software management process 180 performs self-repair functionality at two levels, automatic and administrator commanded. For example, the NC server 170 may be configured to automatically replace the shadow volume at every boot of a NC client 150. This insures that every time that NC client boots it will have a complete, functional operating system regardless of any changes any connected user has made to their system. In the event that a user performs some action which would damage their operating system in a standard desktop environment, the server software management process 180 repairs that damage at the next boot.

According to one embodiment, the user environment management process 182 tracks and maintains the persistent user data 186 to insure that changes the user has made during the current session will be persistent at the next logic. For example, upon termination of a user session, preferences, desktop items, and various other information representing changes made by the user during the user session are copies to a user-specific storage location on the NC server 170. Subsequently, at the user's next login, from the same or different NC client, the user environment management process 182 will retrieve the data from the corresponding user-specific storage location and return it to the NC client thereby allowing the user to login to any NC client of the NC system 100 and have the same user experience.

In one embodiment, the administration tool 188 facilitates NC system administration by automating certain file manipulations that are common for software installation and configuration changes. The administration tool 188 is described further below.

While for purposes of illustration, the boot server process 172, the server software management process 180, the user environment process 182, and the administration tool 188 are shown as part of a single NC server 170, in alternative embodiments, they may be distributed in whole or in part across multiple server computer systems. Additionally, the system volumes 174, the application volumes 176, the user registry 178, the non-persistent client-specific data 184, and the persistent user data 186 may be independently distributed across multiple server computer systems.

The NC client 150 includes one or more system volume images 160 and one or more application volume images 162. The outlines of the system volume images 160 and the application volume images 162 are shown with dotted outlines because preferably only representations of the content of the corresponding NC server volumes are stored in random access memory of the NC client 150 rather than copies of the actual underlying data and files of the corresponding NC server volumes.

The NC client also includes a file system 152, a block device driver 154, a network stack 156, and a network device driver 158, each of which may include hard-wired circuitry or machine-executable instructions or a combination thereof. Furthermore, at least a portion of such hard-wired circuitry and/or machine-executable instructions may be shared between a combination of the file system 152, the block device driver 154, the network stack 156, and the network device driver 158. In one embodiment, at least one storage area/memory (e.g., a machine-readable medium) having appropriate routines and/or data stored therein coupled to at least one processor is utilized, at least in part, to implement one or a combination of the file system 152, the block device driver 154, the network stack 156, and the network device driver 158.

The file system 152 represents logical structures and software routines that are used to control access to and from a local storage medium, such as a hard disk system. Since the NC client 150 may not have a local mass storage device, the file system 152 may actually control access to and from a remote storage medium with or without knowledge that this is occurring. According to one embodiment, the file system 152 operates as if the contents of the system volumes 160 are, in fact, contained on a local hard drive and the file system's read and write requests are redirected at a lower level of the operating system. In an alternative embodiment, the file system 152 itself may be given knowledge regarding the need to read and write to the network rather than to a local hard drive.

The block device driver 154 services file system read and write requests to the system volumes 160. In one embodiment, the block device driver 154 appears to the file system 152 to be a standard hard drive device driver. However, in reality, the block device driver 154 may be configured to service the read and write requests of the file system 152 by accessing the NC server 170. As will be discussed further below, in one embodiment, one or more shadow volumes, may be created for the NC client 150 and stored with the non-persistent client-specific data 184 for the purpose of storing user preferences and/or changes to the operating system. Therefore, some mechanism is needed to direct reads and writes to the appropriate volume, e.g., the shadow volumes or the system volumes 174. According to one embodiment, the block device driver 154 has knowledge of the separate shadow volumes and system volumes 174 and redirects read and write requests to the appropriate volume. Alternatively, server-side logic may perform the redirection locally.

The network stack 156 represents logical structures and software routines that are used to control access to and from the data communication link 140. In this example, the network stack 156 employs the services of the network device driver 158 to transform data into electrical signals that are appropriate for the specific type of physical media, such as Ethernet.

Exemplary Digital Processing System

Figure 2:
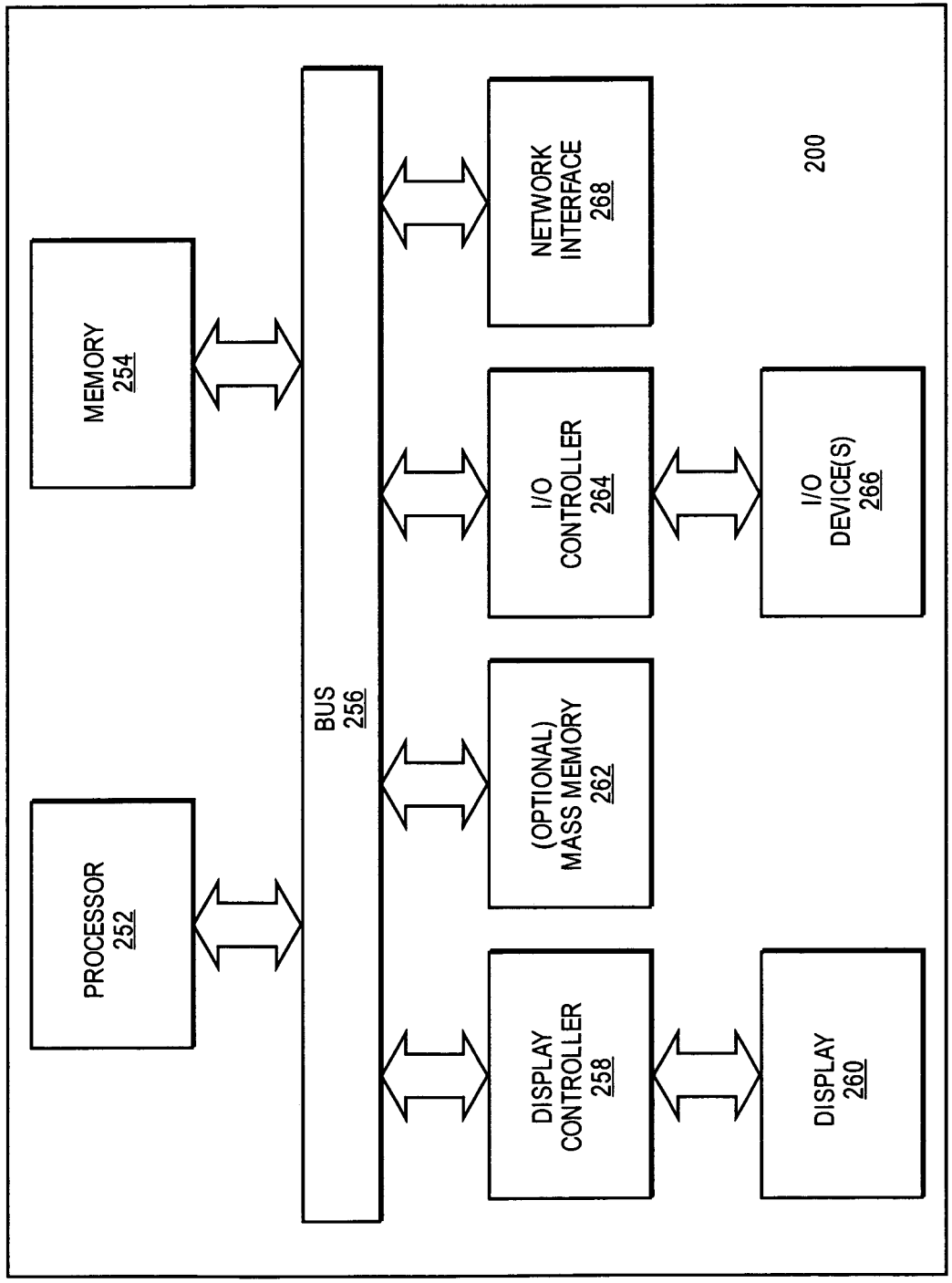
FIG. 2 is a block diagram of a digital processing system which may be used in accordance with one embodiment of the present invention.

FIG. 2 is a block diagram of a digital processing system which may be used in accordance with one embodiment of the present invention. For example, the digital processing system 200 shown in FIG. 2 may be used as an NC client, an NC server, or other server computer system, such as an NT server. The digital processing system 200 may be interfaced to external systems through a network interface 268. It will be appreciated that the network interface 268 may be considered as part of the digital processing system 200. The network interface 268 may be an analog modem, an ISDN modem, a cable modem, a token ring interface, a satellite transmission interface, a wireless interface, or other interface(s) for providing a data communication link between two or more digital processing systems.

The digital processing system 200 includes a processor 252, which may represent one or more processors and may include one or more conventional types of such processors, such as Motorola PowerPC processor, an Intel Pentium (or x86) processor, etc. A memory 254 is coupled to the processor 252 by a bus 256. The memory 254 may be a dynamic random access memory (DRAM) and/or may include static RAM (SRAM). The processor may also be coupled to other types of storage areas/memories (e.g., cache, Flash memory, disk, etc.), which could be considered as part of the memory 254 or separate from the memory 254.

The bus 256 further couples the processor 252 to a display controller 258, an optional mass memory 262, the network interface 268, and an input/output (I/O) controller 264. The mass memory 262 may represent a magnetic, optical, magneto-optical, tape, and/or other type of machine-readable medium/device for storing information. For example, the mass memory 262 may represent a hard disk, a read-only or writeable optical CD, etc. The display controller 258 controls in a conventional manner a display 260, which may represent a cathode ray tube (CRT) display, a liquid crystal display (LCD), a plasma display, or other type of display device. The I/O controller 264 controls I/O device(s) 266, which may include one or more keyboards, mouse/trackball or other pointing devices, magnetic and/or optical disk drives, printers, scanners, digital cameras, microphones, etc.

It will be appreciated that the digital processing system 200 represents only one example of a system, which may have many different configurations and architectures, and which may be employed with the present invention. For example, Macintosh and Intel systems often have multiple busses, such as a peripheral bus, a dedicated cache bus, etc. On the other hand, a network computer, which may be used as a digital processing device of the present invention, may not include, for example, a hard disk or other mass storage device, but may receive routines and/or data from a network connection, such as the network interface 268, to be processed by the processor 252. Similarly, a Web TV system, which is known in the art, may be considered to be a digital processing system of the present invention, but such a system may not include one or more I/O devices, such as those described above with reference to I/O device(s) 266. Additionally, a portable communication and data processing system, which may employ a cellular telephone and/or paging capabilities, may be considered a digital processing system which may be used with the present invention.

The processor 252 may execute one or more routines to redirect read and write requests from the file system 152 of the NC client to an appropriate volume on the NC server. Such routines may be stored in the mass memory 262, the memory 264, and/or another machine-readable medium accessible by the digital processing system 200. According to one embodiment of the present invention, a network computer (NC) system maintains a copy of the operating system in the mass memory 262 (and/or the memory 254) that cannot be corrupted by ordinary users of the NC system. Additionally, the NC system may preserve user customizations, such as preferences, by maintaining individual, user, storage areas in the mass memory 262 (and/or the memory 254). When an NC client boots from the network and accesses the operating system from an NC server, the user's preferences are dynamically merged with the system environment provided to the NC client. Advantageously, since, the user's desktop preferences and other customized settings are all preserved from session to session and supplied to the NC client as it boots from the network, the user may login to any NC client on the network and have the same user experience. According to another embodiment, a network administrator can upgrade every NC client in the NC system to a new version of the operating system by simply replacing a single file on the NC server. Further, according to another feature of the present invention, the network administrator can perform such an upgrade remotely from any NC client of the NC system. Advantageously, in this manner, NC system administration and maintenance costs are kept low as compared to a typical network of thick clients that each has a local copy of the operating system that must be replaced.

Net-booting Overview

Figure 3:
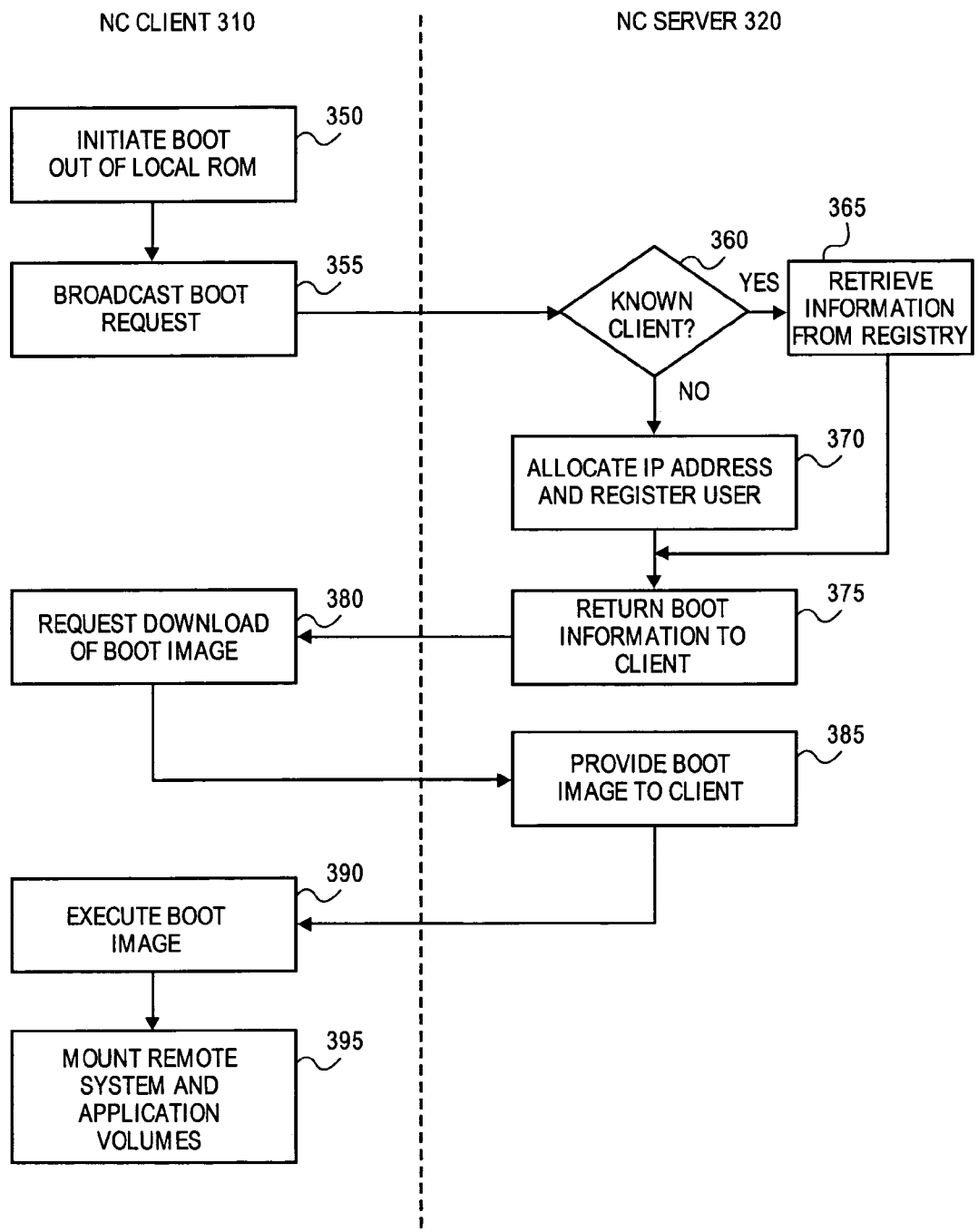
FIG. 3 is a flow diagram illustrating processing that occurs on an NC client and an NC server to accomplish a net-boot of the NC client according to one embodiment of the present invention.

Having briefly described an exemplary environment in which the present invention may be employed, exemplary net-boot processing will now be described with reference to FIG. 3. Providing a reliable, fault-tolerant and maintainable operating system for all NC clients in a net-booted environment is an important component in insuring the successful implementation of such as system. NC clients have no operating system internally. Therefore, they depend on reliably retrieving a complete operating system from the network to boot and continue operations.

The NC system environment and the net-booting process described herein are intended to provide the needed reliability. The net-booting process generally breaks down into an address determination and bootfile selection phase, a file transfer phase, a RAM boot phase and a system boot. The address determination and bootfile selection phase is represented by steps 350 through 375, the file transfer phase includes steps 380 and 385, and the RAM boot phase is represented by steps 390 and 395. Briefly, for administrative and maintenance purposes, preferably only the NC server 320 has a copy of the master read-only operating system image and NC clients boot according to the net-booting process described below. Since rebooting an NC client restores the NC client to a standard, useable state, it is impossible for a user without proper access privileges to make an NC client unbootable. Consequently, this NC system architecture and net-booting approach greatly simplifies NC client administration and provides a high level of reliability for the NC clients.

The first phase of the net-booting processing begins at step 350. After the NC client 310 has powered on, the NC client 310 starts the address determination and bootfile selection phase by initiating the boot process out of a local read-only memory (ROM). This may include executing power-on self tests, acquiring device information, and performing any other functions necessary to give the NC client 310 a basic identify.

At step 355, the NC client 310 connects to the network and asks for additional information to be provided to it that will allow it to boot further. According to one embodiment, the request for additional information takes the form of a Bootp request. In alternative embodiments, the Dynamic Host Configuration Protocol (DHCP) may be employed.

At step 360, the NC server 320 receives the boot request and determines if the request is from a known NC client. For example, the NC server 320 may search the user registry 178 for the NC client's hardware address.

If the NC client 310 is unknown to the NC server 320, then an IP address is allocated for the NC client 310 at step 370 and registration processing is performed. In order to allow the NC server 320 to recognize the NC client 310 next time it boots, information regarding the NC client 310 may be stored in the user registry 178. For example, the NC client's hardware address can be marked as known in the user registry 178 and the IP address allocated can be associated in the user registry with the NC client's hardware address. User registration processing may include creating a user for this NC client 310, e.g., by adding the user to the user registry 178, and creating a private system file for the user.

If the NC client 310 is known to the NC server 320, then at step 365 information regarding the NC client 310, such as its IP address may be retrieved from the user registry 178.

At step 375, boot information is returned to the NC client 310. The boot information may include, among other things, the IP address of the NC client 310, the IP address of the NC server 320, the name of the file to be loaded into the NC client's memory and executed, and the names and locations of shadow volumes, if any.

The second phase of the bootstrapping process, file transfer of the bootfile, begins at step 380. According to one embodiment, the NC client 310 sends a file transfer request to the NC server 320 specifying the bootfile identified in the NC server's Bootp reply. At step 385, the NC server 320 responds by initiating the transfer of the boot image. Upon receipt at the NC client 310, the boot image is stored in a local RAM of the NC client 310.

After the NC client 310 has received the boot image from the NC server 320, the RAM boot phase begins at step 390. During the RAM boot phase, the NC client 310 begins to execute the boot image out of the local RAM. According to one embodiment, the boot image is a Macintosh ROM image that performs additional machine initialization, and creates a Macintosh environment. In alternative embodiments, the boot image may create other operating environments, such as Windows 95/98, Windows NT, Windows 2000, etc. In one embodiment, the block device driver 154 may be included as part of the boot image. Alternatively, the block device driver 154 may be part of the NC client's ROM.

Finally, at step 395, the NC client 310 mounts the remote system and application volumes 174 and 176. Other boot processing (not shown) may include a system boot phase in which the setting up of the operating environment is completed and the virtual memory subsystem is initialized. At this point, a login may be presented on the NC client 310. Based upon the user information, the user environment management process 182 may move all the components that are specific to this user, including preferences, to the user's system environment.

System Read/Write Redirection

As indicated above, the NC client 150 may or may not have a local storage medium, such as a hard disk system. Therefore, in one embodiment, the block device driver 154 may redirect read and write requests received from the file system 152 to a remote storage medium on the NC server 170, for example.

Figure 4:
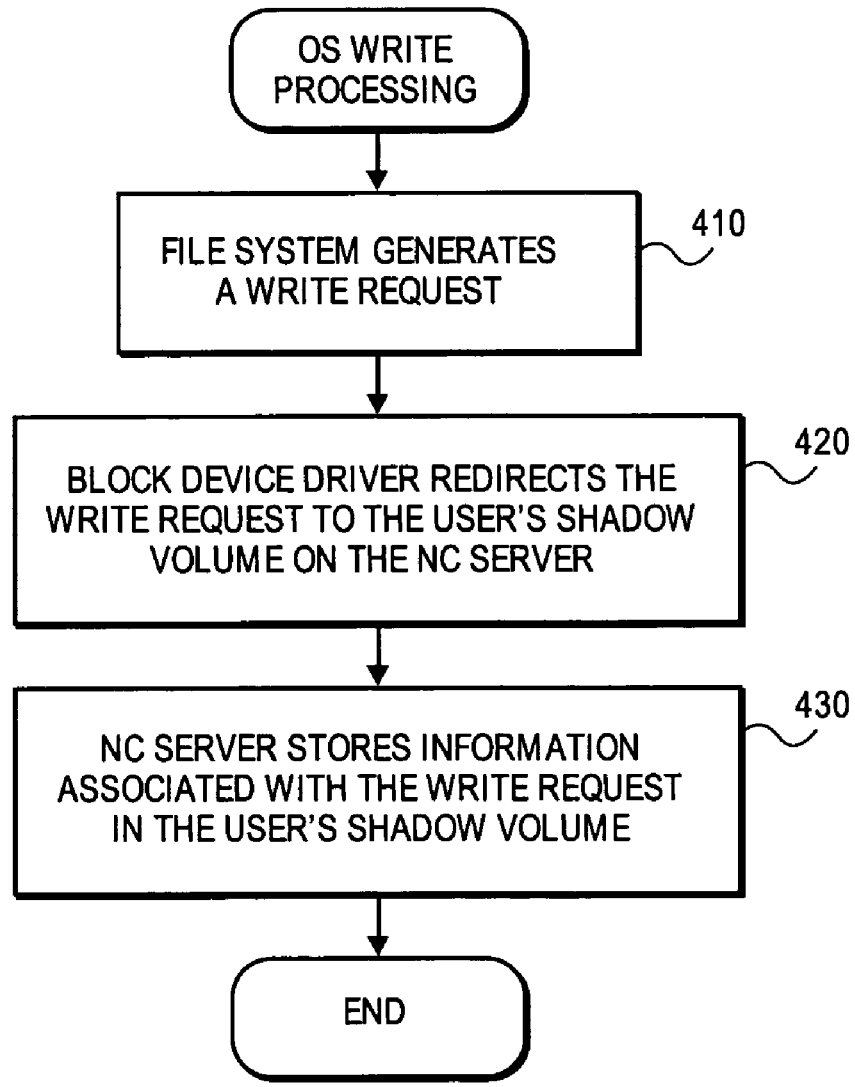
FIG. 4 is a flow diagram illustrating how NC client write requests directed to the system volume are handled according to one embodiment of the present invention.

FIG. 4 is a flow diagram illustrating how NC client write requests directed to the system volumes 160 are handled according to one embodiment of the present invention. In one embodiment, the steps described below may be performed under the control of a programmed processor, such as processor 252. However, in alternative embodiments, the steps may be fully or partially implemented by any programmable or hardcoded logic, such as Field Programmable Gate Arrays (FPGAs), TTL logic, or Application Specific Integrated Circuits (ASICs), for example.

According to the embodiment depicted, at step 410, the file system 152 generates a write request directed to the system volumes 160. The write request is received by the block device driver 154 and redirected by the block device driver 154 at step 420 by translating it into a write request directed to the user's shadow volume on the NC server 170. At step 430, the NC server 170 stores information associated with the write request in the shadow volume associated with the NC client 150. In this manner, the file system 152 need not be aware that attempted modifications to the system volumes 160 are recorded instead in a client-specific shadow volume residing on the NC server 170.

In alternative embodiments, however, the file system 152 may be configured to recognize that write requests should be directed to the network interface 268. In these embodiments, the file system 152 may be configured to bypass the block device driver and interface directly with the network stack 156.

In other embodiments, the block device driver 154 may retain knowledge that writes are to be redirected to the NC server 170, but may not be aware of the existence of the shadow volume. Therefore, the block device driver 154 will issue write requests to the NC server 170, but will issue these requests to the system volumes 174 rather than the shadow volume. In this situation, logic on the NC server 170 will redirect the write requests received from the NC client 150 to the appropriate shadow volume.

According to yet another alternative embodiment, the NC server 170 may maintain separate copies of the operating system software in its entirety for each user. However, this would likely have the effect of increasing complexity of the NC server 170 and could potentially dramatically increase the storage requirements of the NC server 170.

Figure 5:
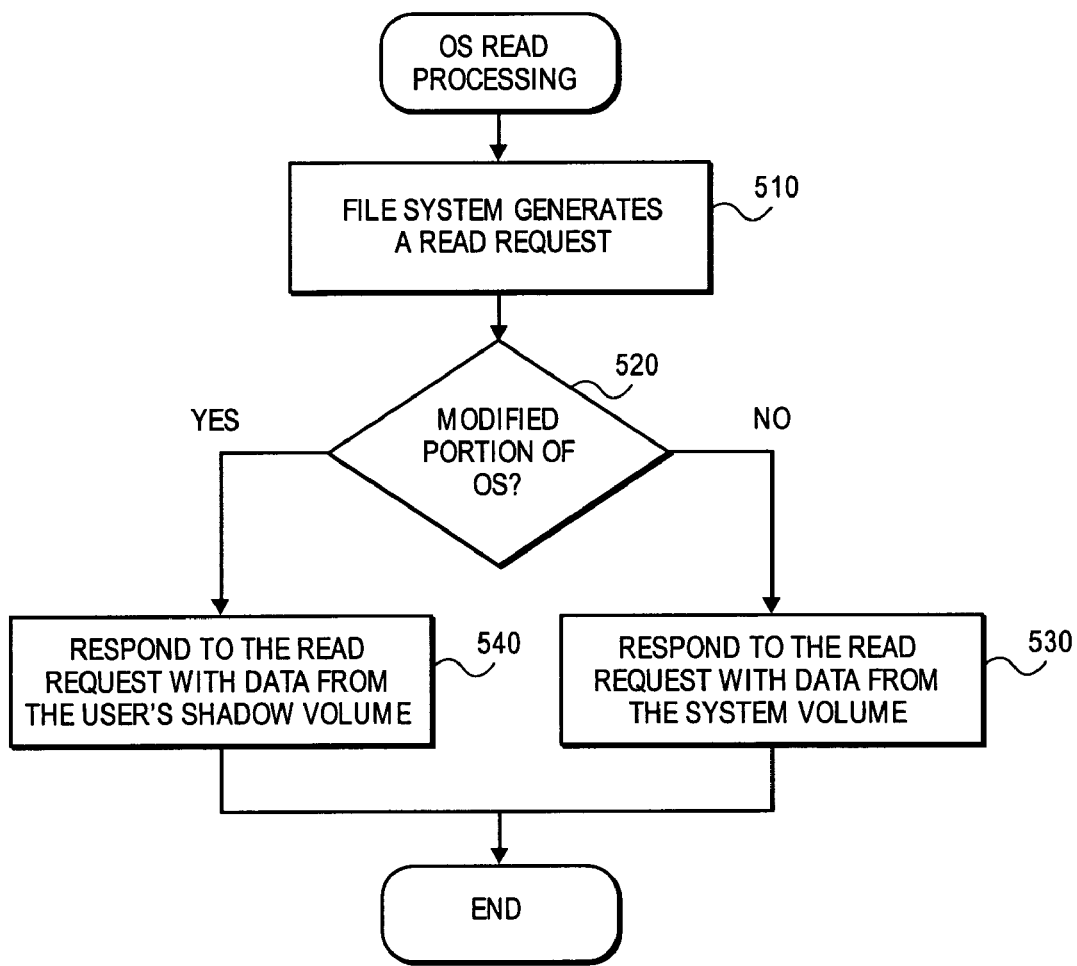
FIG. 5 is a flow diagram illustrating how NC client read requests directed to the system volume are handled according to one embodiment of the present invention.

Referring now to FIG. 5, NC client read request processing will now be described according to one embodiment of the present invention. In one embodiment, the steps described below may be performed under the control of a programmed processor, such as processor 252. However, in alternative embodiments, the steps may be fully or partially implemented by any programmable or hardcoded logic, such as Field Programmable Gate Arrays (FPGAs), TTL logic, or Application Specific Integrated Circuits (ASICs), for example.

In the embodiment depicted, it is assumed that the shadow volume contains only those portions of the operating system that have been modified by the user rather than a complete copy of the operating system as modified. The various options regarding the granularity of the portions written to the shadow volume are discussed below.

At any rate, according the present example, at step 510, the file system 152 generates a read request directed to the system volumes 160. At step 520, the read request is received by the block device driver 154 and a determination is made whether the read request specifies a portion of the operating system that has been modified by the user or whether the read request specifies a portion of the operating system that remains unchanged. If the read request corresponds to a portion of the operating system that has not been modified by the user, the processing continues with step 530. However, if the read request corresponds to a portion of the operating system that has been previously modified by the user, then processing continues with step 540.

At step 530, the block device driver directs the NC server 170 to retrieve the information associated with the read request from the system volumes 174.

At step 540, the block device driver directs the NC server 170 to retrieve the information associated with the read request from the user's shadow volume.

In this manner, the file system 152 need not be aware of the particular mechanism used to coordinate user modifications with the original operating system as contained in the system volumes 174.

In alternative embodiments, rather than having the block device driver 154 keep track of which portions of the operating system that have been modified by the user, such a tracking mechanism may be implemented centrally on the NC server 170. In this case, the NC server 170 would make the determination of step 520 and provide the appropriate read responses in steps 530 and 540.

In yet another embodiment, the NC server 170 may maintain separate copies of the operating system in its entirety for each user, including any user-specific modifications. In this case, neither the block device driver 154 nor the NC server 170 would need to track which portion(s) of the operating system contain user modifications. Rather, the portion of the user-specific copy of the operating system corresponding to the read request may simply be returned in response to the read request.

Exemplary Server Directory Structure

Figure 6:
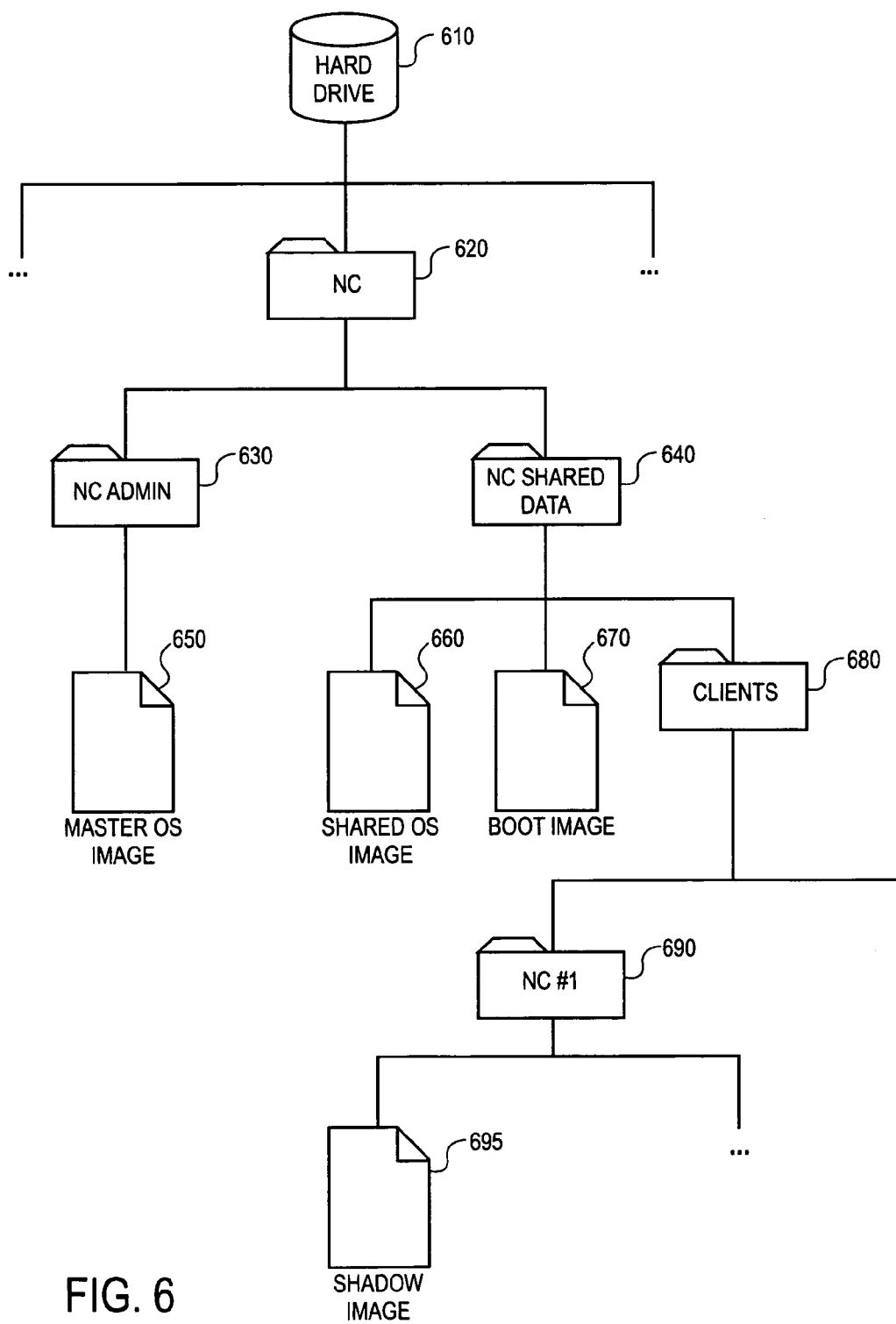
FIG. 6 is a simplified block diagram illustrating an exemplary hierarchical directory structure that may be used by an NC server according to one embodiment of the present invention.

FIG. 6 is a simplified block diagram illustrating the layout of an exemplary hierarchical directory structure that may be used by an NC server according to one embodiment of the present invention.

According to the embodiment depicted, a hard drive 610 of the NC server 170 or other mass storage device associated with the NC server 170 includes an NC folder (directory) 620. Within the NC folder 620 are an NC admin folder 630 and an NC shared data folder 640. The NC admin folder 630 is preferably inaccessible to ordinary users that do not have proper access privileges and includes a read-only, master operating system image 650.

The NC shared data folder 640 includes a shared operating system image 660, a boot image 670, and a clients folder 680. The shared operating system image 660 is a read-write version of the read-only master operating system image 650 and may be mounted by the NC client 150 as part of step 395. The boot image 670 is downloaded and executed by the NC client 150 after the first phase of the bootstrapping process in order to create an operating environment on the NC client 150, such as a Macintosh or Windows environment.

The clients folder 680 is an area that may be used to store non-persistent client-specific information, such as modifications to the shared operating system 660. In this example, the NC clients are numbered from 1 to N and the clients folder 680 includes a folder for each NC client. For example, an NC #1 folder 690 is an area for storing client-specific information, such as a shadow image 695, corresponding to NC client #1. As described above, the shadow image 695 preferably contains only portions of the shared operating system image 660 that have been modified by the user. However, the shadow image 695 may be a user-specific copy of the shared operating image 660 in its entirety.

Network Computer System Administration

As described above, according to one embodiment, NC system administration is facilitated by a feature of the boot server process 172 that serves application and system images to the NC client 150 as a read-write file if such images exist in the NC client's folder. Thus, a user of the NC client 150 having proper access privileges is provided with the ability to upgrade the NC system by replacing the existing images being served to the NC clients with modified versions containing, for example, new system or application software or configuration changes.

Figure 7:
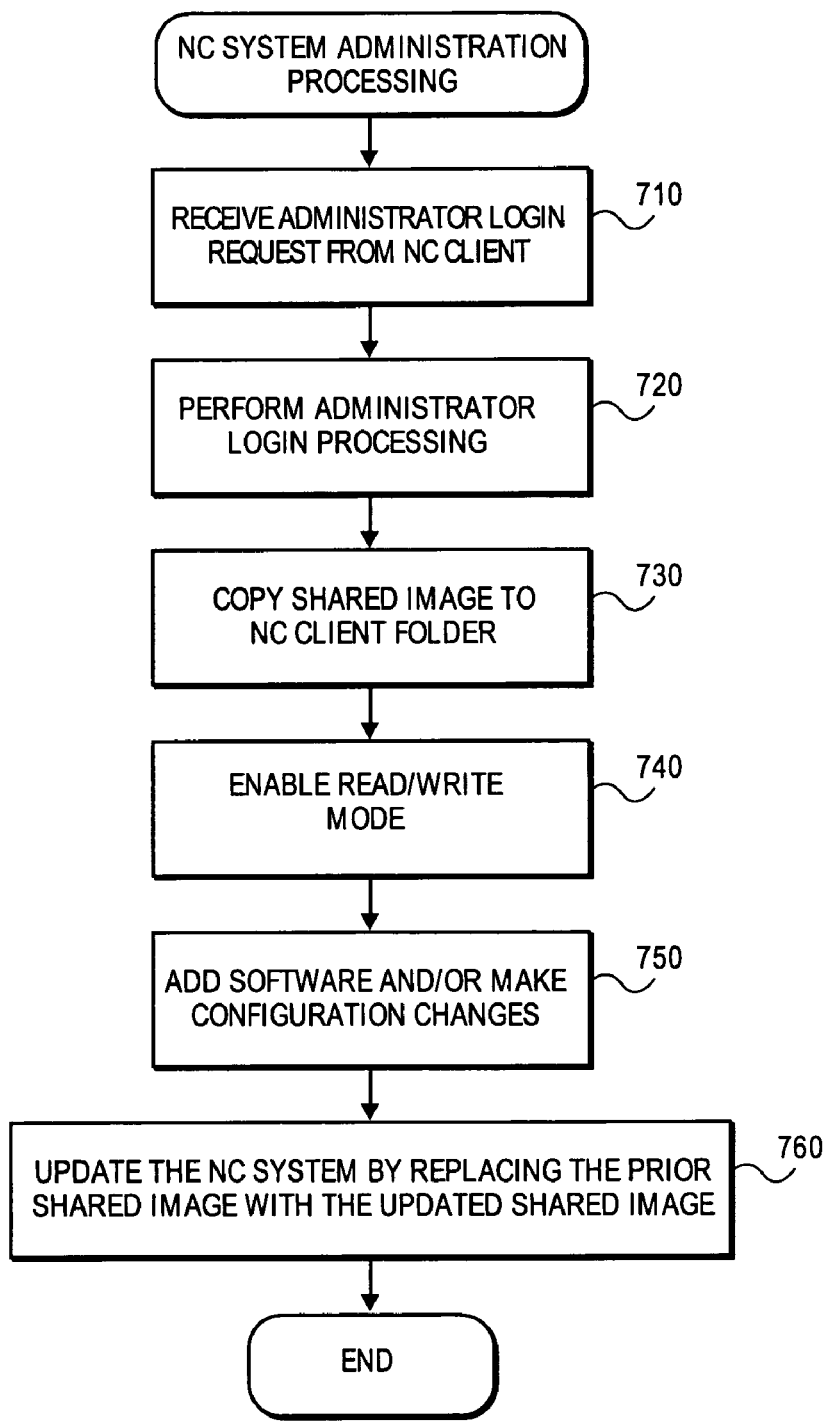
FIG. 7 is a flow diagram illustrating NC system administration processing according to one embodiment of the present invention.

FIG. 7 is a flow diagram illustrating NC system administration processing according to one embodiment of the present invention. According to this example, at step 710, the NC server 170 receives an administrator logic request from the NC client 150. At step 720, the NC server 170 performs administrator login processing to verify the user has appropriate access privileges on the NC system 100. Assuming the user has appropriate access privileges, processing continues with step 730. At step 730, one or more shared images (e.g., shared operating system image 660 and/or a shared application image) are copied to the NC client's folder on the NC server 170. At step 740, editing of the one or more shared image copies (the working copies) is enabled. According to one embodiment, this is accomplished by simply rebooting the NC client 150 as discussed above. Alternatively, the attributes associated with the working copies may be modified in some other manner so as to make them editable by the user. In any event, at step 750, the user may add software and/or make configuration changes to the working copies. Finally, the NC system is updated at step 760 by replacing the one or more shared images currently being served to NC clients with the working copies. Advantageously, in this manner, there is no need to log users out to insure that changes have been propagated across all the images. Instead, changes become accessible to a NC client the next time that NC client is booted thereby allowing all connected users to easily complete whatever tasks they are working on without impeding NC system administration.

According to one embodiment, steps 730, 740, and 760 may be provided as part of the administration tool 188. The first execution of the administration tool 188 may accomplish step 730 by copying the shared images to the appropriate NC client folder. After the copies are complete, the administration tool 188 may automatically restart the NC client 150, which will boot up with read-write access to the working copies.

At this point, the network administrator is free to add software and/or make configuration changes. When the network administrator has completed his/her changes, the administration tool 188 can be run for a second time at which point the network administrator may be presented with the option of either committing (saving) or discarding the changes to the working copies.

If the administrator chooses to discard the changes, the administration tool 188 marks the working copies for deletion. Note that immediate deletion of the working copies is not desirable because the NC client 150 is still using the working copies. Rather, it is preferable to remove the working copies that are marked for deletion during a subsequent boot of the NC client 150. In one embodiment, the administration tool 188 automatically restarts the NC client 150 thereby causing the removal of the working copies and causing the NC client 150 to boot from the shared images.

If the administrator chooses to commit the changes, the administration tool 188 can immediately replace the shared images with those of the working copies that have been edited which makes the updates immediately available to any NC client that subsequently boots.

Advantageously, the administration tool 188 allows the network administrator to remotely modify the shared images on the NC server 170 from an NC client without having to access the NC server 170 directly. Additionally, use of the administration tool 188 allows the administrator to update the NC system 100 without having to know about or directly manipulate the files on the NC server 170.

Figure 8:
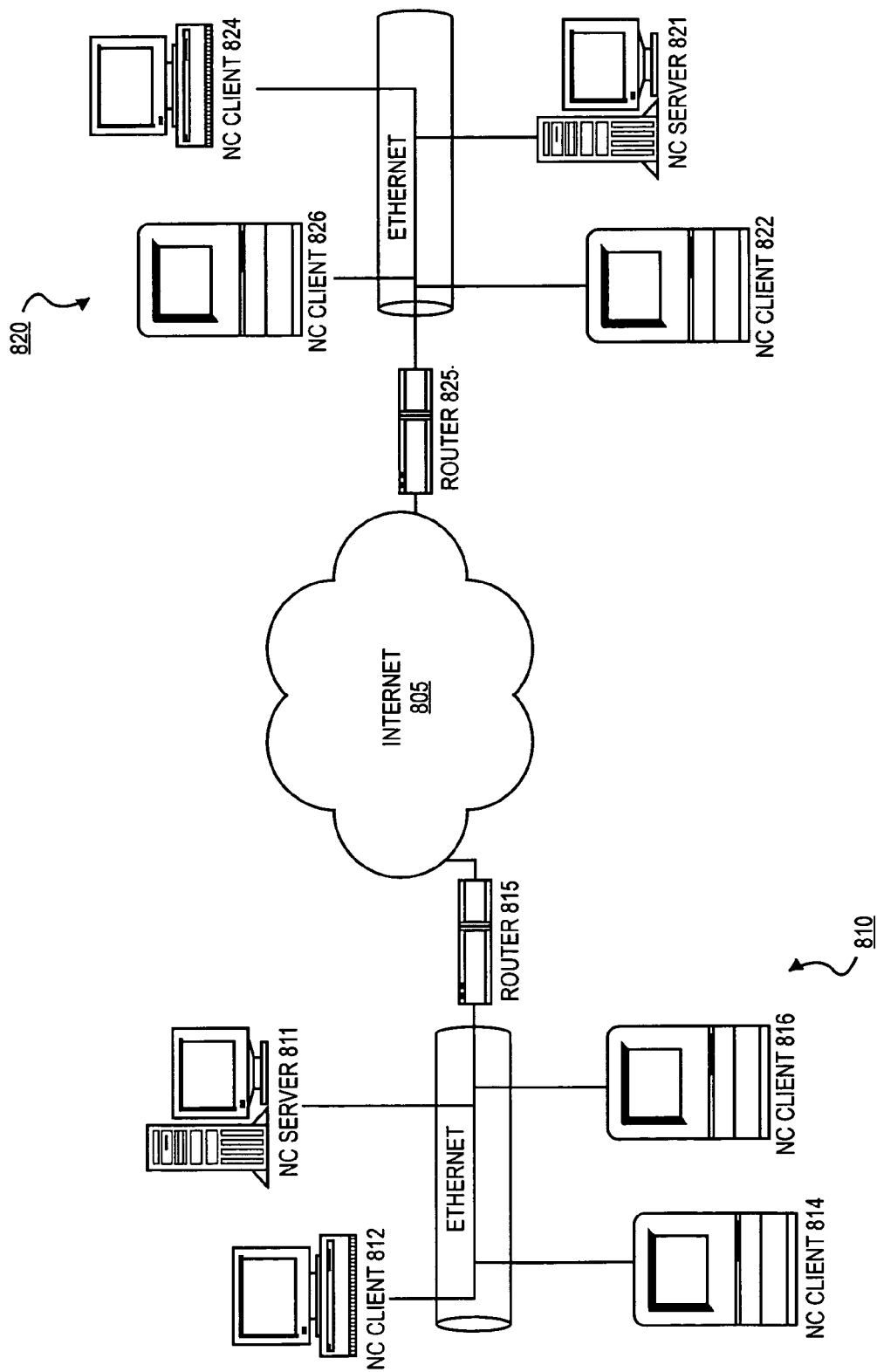
FIG. 8 is a simplified block diagram illustrating two NC systems coupled via the Internet.

FIG. 8 is a simplified block diagram illustrating two NC systems 810 and 820 coupled via the Internet 805. It is contemplated that the NC system configuration process described above with reference to FIG. 7 may also be useful in connection with the reconfiguration of remote NC systems. For example, the administration tool 188 may be run from any of NC clients 812, 814, or 816 to install a new application program on local NC system 810 that is desired by the users of the local NC system 810 as well as by the users of NC clients 822, 824, and 826 of remote NC system 820. After completing the steps described above for installation on the local NC system 810, the administration tool 188 running on NC system 810 may replicate the modified shared images to the remote NC system 820.

Split Operating System

Figure 9:
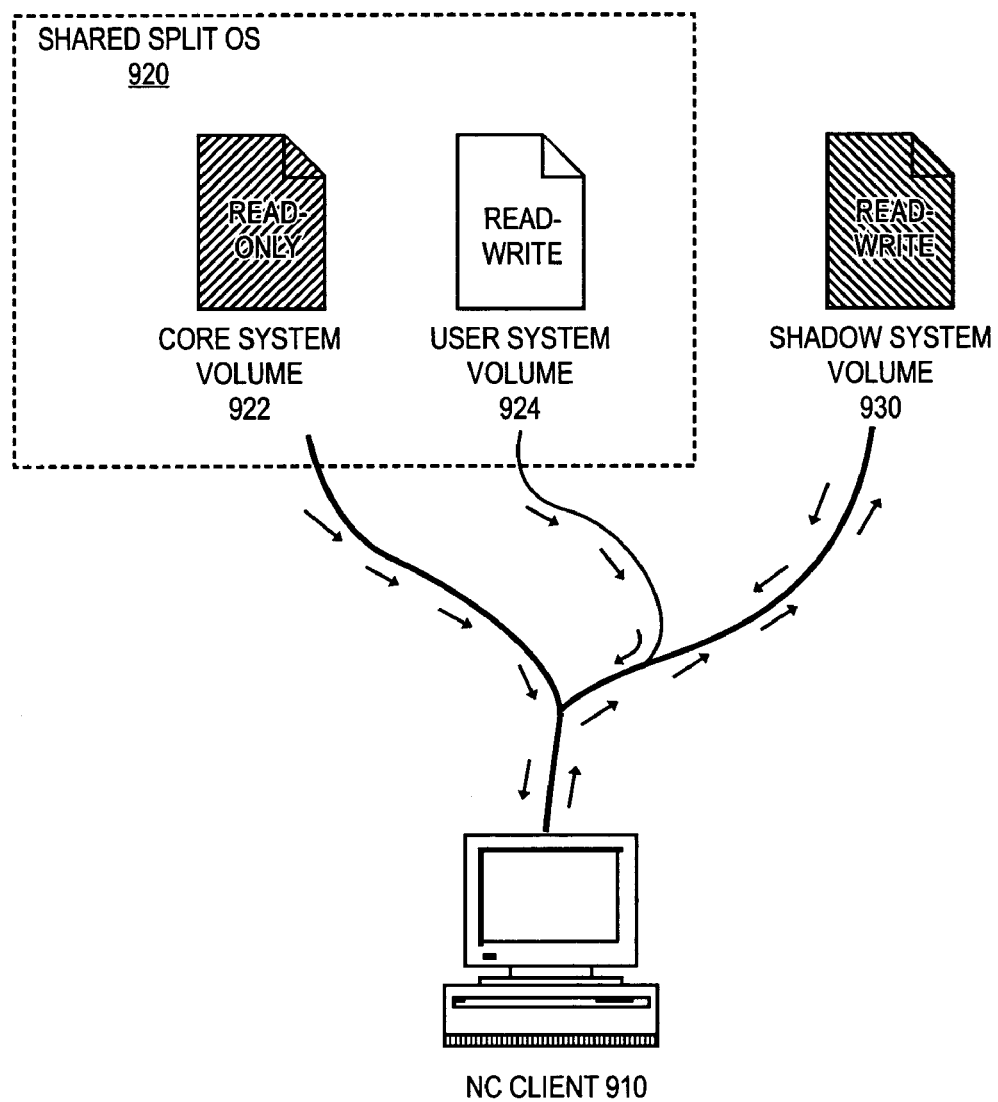
FIG. 9 is a block diagram that conceptually illustrates NC client interaction with a SplitOS according to one embodiment of the present invention.

FIG. 9 is a block diagram that conceptually illustrates NC client interaction with a SplitOS 920 according to one embodiment of the present invention. According to the example depicted, the SplitOS 920 of the NC server 170 contains a read-only core system volume image 922 and a read-write user system volume image 924.

The core system volume 922 preferably contains those parts of the system that do not need to be written back to during system operation. One goal of the core system volume 922 is to provide all the system components that are mandatory for system operation. By separating these essential components from the user system volume 924 and protecting them as read-only, an additional level of stability is provided to the NC system 100 since a user will be unable to delete or move items that are essential to system operation.

The user system volume 924 contains all the user-configurable system components, including preferences and all the system additions installed by application software, such as application-installed extensions and libraries. Additionally, the user system volume 924 may contain applications that cannot be run from an AppleShare server and/or other system components that do not function on a read-only volume.

Preferably, the NC server 170 also creates a shadow system volume 930 for each connected NC client. The shadow system volume 930 shadows the user system volume 924 by storing modifications that are made to the user system volume 924. In alternative embodiments, the NC server 170 may provide a separate user system volume 924 for each connected NC client.

As described above, according to one embodiment, the shadow system volume 930 is used by the block device driver 154 of the NC client 150 to implement a "copy-on-write" storage scheme in which modifications (writes) directed to the user system volume 930 are instead copied to the shadow system volume 930. In one embodiment, the shadow system volume 930 is not visible to the user. Consequently, the user system volume 924 will appear to be the location where all writes are directed. For example, if a user modifies a preference, that preference will appear to be written to the preference file located in the preferences folder on the user system volume 924.

As indicated by the directional arrows along the connections between the core system volume 922, the user system volume 924, and the shadow system volume 930 and the NC client 910, data may be read from each of the core system volume 922, the user system volume 924, and the shadow system volume 930; however, data may only be written to the shadow system volume 930.

Shadow System Volume

Figure 10:
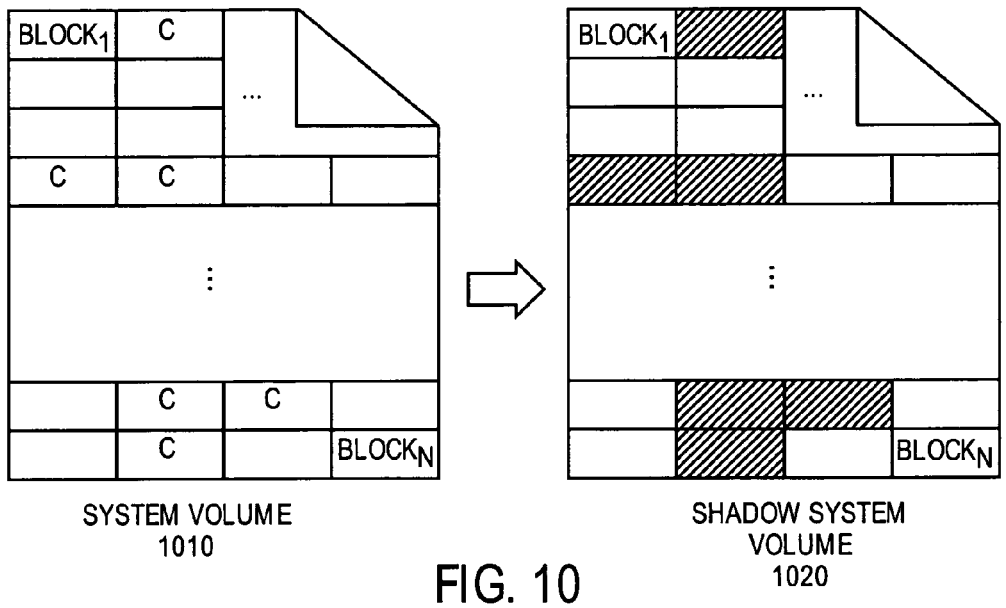
FIG. 10 is a block diagram that conceptually illustrates the structure of a shadow system volume according to one embodiment of the present invention.

FIG. 10 is a block diagram that conceptually illustrates the structure of a shadow system volume 1020 according to one embodiment of the present invention. In this example, the shadow system volume 1020 is a complete copy of the system volume 1010 with any user-modifications incorporated therein. Therefore, the disk space used by the shadow system volume 1020 will be approximately the same as that used by the system volume 1010.

Banding

Figure 11:
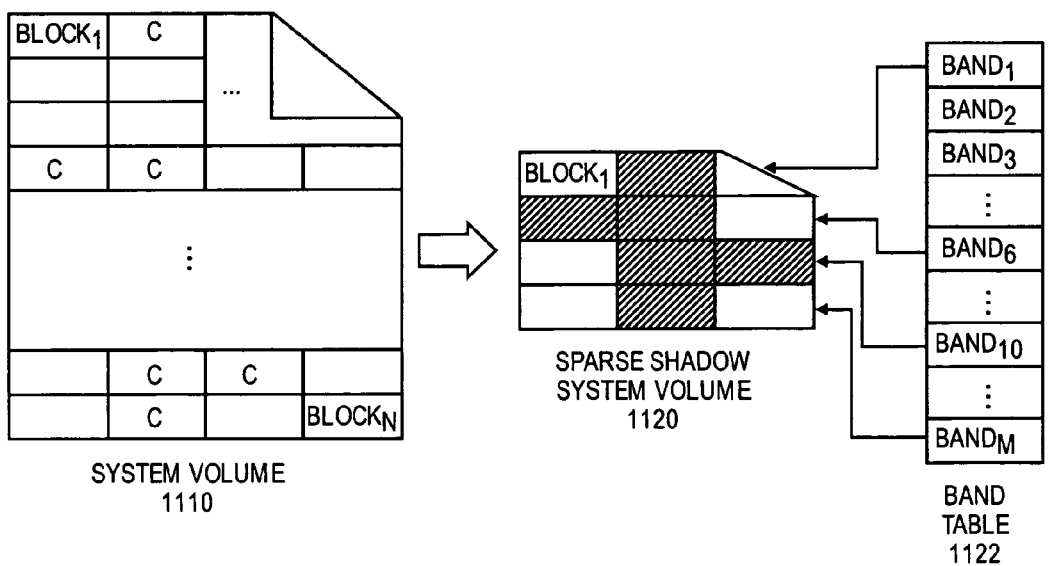
FIG. 11 is a block diagram that conceptually illustrates the structure of a shadow system volume according to another embodiment of the present invention in which a banding feature is employed.

FIG. 11 is a block diagram that conceptually illustrates the structure of a sparse shadow system volume 1120 according to another embodiment of the present invention in which a banding feature is employed. According to this embodiment, the sparse shadow system volume 1120 is written in band increments rather than as an entire file. A band is a predetermined number of blocks. For example, according to one embodiment bands are 128K (256 512-byte blocks). In alternative embodiments, the band size may be more or less. Using bands, the disk space used by the shadow volume 1120 will consist only of the actual data written (in band increments).

According to one embodiment of the banding feature, the inherent one-to-one block mapping in copy-on-write images may be replaced with a table or other data structure that maps a band of the primary file to a corresponding band in the shadow file. Logic may be included in the block device driver 154, for example, to break up requests into the largest contiguous chunks possible. In this manner, both reads and writes can span non-contiguous band boundaries.

The main motivation for banding is to reduce disk space requirements of the NC client shadow system images. According to one embodiment, the reduction is achieved by only storing those bands which have actually been written to. An exemplary band table 1122 is a simple array allocated at initialization. Entries in the table are assigned BAND_NONE until the corresponding band is written to, at which point the next available band in the shadow file is assigned. In order to encourage contiguous blocks on the NC server's file system, in one embodiment, if bands are allocated during a write, the shadow file size is increased to the appropriate number of bands before the write request is sent.

Exemplary Machine-Readable Medium

Figure 12:
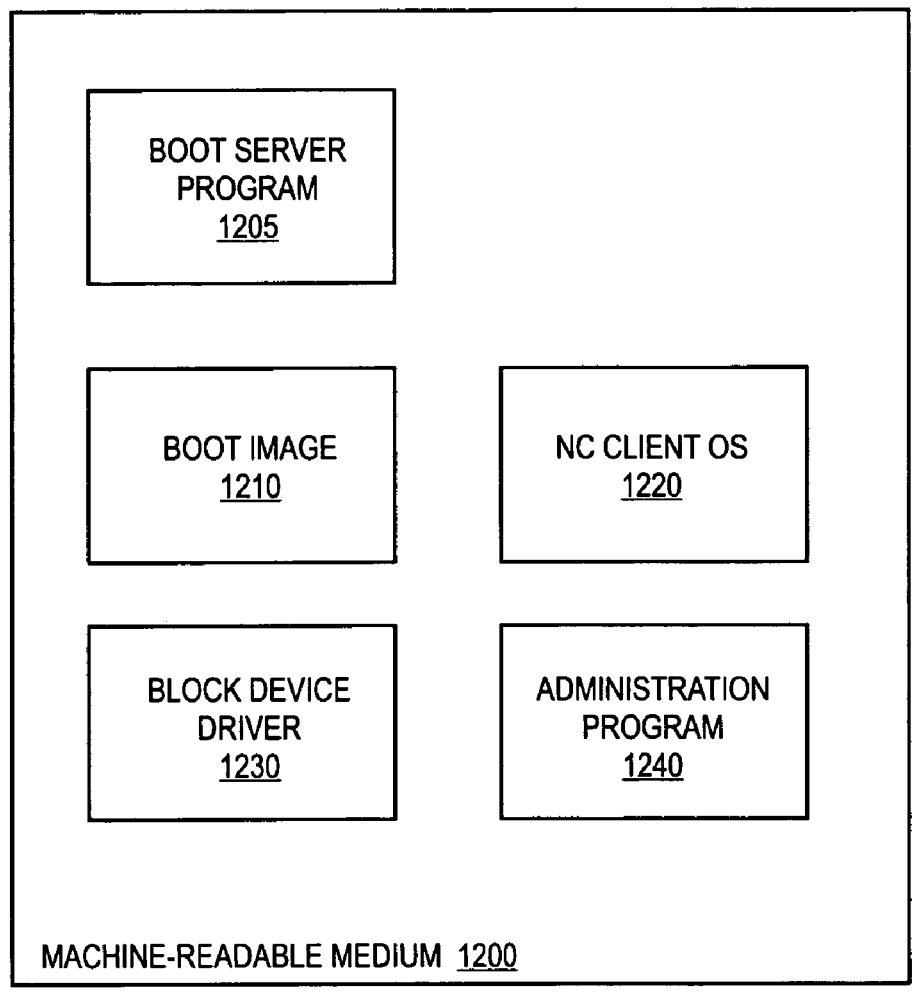
FIG. 12 is an example of a machine-readable medium that may be accessed by a digital processing system, such as an NC client or an NC server, according to one embodiment of the present invention.

FIG. 12 is an example of a machine-readable medium 1200 that may be accessed by a digital processing system, such as an NC client or an NC server, according to one embodiment of the present invention. Importantly, the actual memory that stores the elements shown in and described below with reference to FIG. 12 may comprise one or more disks (which may, for example be magnetic, optical, magneto-optical, etc.), the memory 254 and/or the mass memory 262 described above with reference to FIG. 2, or a combination thereof. Additionally, one or more of the elements of the machine-readable medium 1200 may be stored at one digital processing system, such as an NC server, and downloaded or transmitted to another digital processing system, such as an NC client or another NC server. Furthermore, the elements described with reference to the machine-readable medium 1200 may, at some point in time, be stored in a non-volatile mass memory (e.g., a hard disk). Conversely, at other times, the elements of the machine-readable medium 1200 may be dispersed between different storage areas, such as DRAM, SRAM, disk, etc.

According to one embodiment, the machine-readable medium 1200 is utilized, at least in part, to facilitate administration and maintenance of system and/or application volumes of an NC system in accordance with one or more methods of the invention. For example, the machine-readable medium 1200 may be associated with an NC server and include one or more routines for performing bootstrapping as discussed with reference to FIG. 3 (the boot server program 1205), for performing system read and write processing as discussed with reference to FIGS. 4 and 5 (the block device driver 1230), and/or for performing remote administration of the NC system 100 as discussed with reference to FIG. 7 (the administration program). While the block device driver 1230 is show as being separate from the boot image 1210 in this example, the block device driver may be provided as part of the boot image 1210 in alternative embodiments.

server

ALTERNATIVE EMBODIMENTS

While the invention has been described with reference to specific embodiments and illustrative figures, those skilled in the art will recognize that the invention is not limited to the embodiments or figures described. In particular, the invention can be practiced in several alternative embodiments that provide net-booting and remote administration of an NC system.

Therefore, it should be understood that the method and apparatus of the invention can be practiced with modification and alteration within the spirit and scope of the appended claims. The description is thus to be regarded as illustrative instead of limiting on the invention.

What is claimed is:

1. A method comprising a first network computer (NC) client of a plurality of NC clients causing other of the plurality of NC clients that are subsequently booted from a network to receive a second operating system software that is configured differently than a first operating system software by replacing a first set of one or more system volumes maintained at a NC server containing the first operating system software with a second set of one or more system volumes maintained at the NC server containing second operating system software.

2. The method of claim 1, further comprising the NC client causing those of the plurality of NC clients that subsequently open an application to utilize a modified version of the application by replacing the first set of one or more system volumes, wherein the first set of one or more system volumes further comprise application software.

3. The method of claim 1, wherein at least one NC client of the plurality of NC clients is not rebooted for a period of time after replacing the first set of one or more system volumes.

4. The method of claim 1, wherein the operating system software comprises one of Macintosh, Microsoft Windows 95, Microsoft Windows 98, Microsoft Windows NT, Microsoft Windows 2000, Microsoft Windows CE, AIX, UNIX, and Linux.

5. A method comprising:
- a network computer (NC) client causing a working copy of one or more system volumes on a NC server to be created by copying the one or more system volumes to a storage area separate from the location of the one or more system volumes, the one or more system volumes containing operating system software that is utilized by each of the plurality of NC clients; and
- the NC client causing each of a plurality of NC clients that are subsequently booted from a network to utilize a same single modified operating system by modifying the working copy and replacing the one or more system volumes with the working copy.

6. The method of claim 5, further comprising the NC client causing those of the plurality of NC clients that subsequently open an application to utilize a modified version of the application by replacing the one or more system volumes, wherein the one or more system volumes further comprise application software.

7. The method of claim 5, wherein the operating system software comprises one of Macintosh, Microsoft Windows 95, Microsoft Windows 98, Microsoft Windows NT, Microsoft Windows 2000, Microsoft Windows CE, AIX, UNIX, and Linux.

8. A method comprising:
- a network computer (NC) client booting from a boot image provided by a NC server, the boot image including information identifying the location of one or more system volumes on the NC server, the one or more system volumes containing operating system software;
- creating a working copy of the one or more system volumes on the NC server by copying the one or more system volumes to a storage area separate from the location of the one or more system volumes; and
- modifying the operating system software supplied by the NC server to subsequently net-booted NC clients by modifying, by the NC client, the working copy and replacing the one or more system volumes with the working copy on the NC server.

9. The method of claim 8, further comprising changing an application software supplied by the NC server to NC clients that subsequently open the application by modifying the working copy and replacing the one or more system volumes with the working copy, wherein the one or more system volumes further comprise application software.

10. The method of claim 8, wherein the operating system software comprises one of Macintosh, Microsoft Windows 95, Microsoft Windows 98, Microsoft Windows NT, Microsoft Windows 2000, Microsoft Windows CE, AIX, UNIX, and Linux.

11. A method comprising:
- a network computer (NC) client causing a working copy of one or more system volumes on a NC server to be created by copying the one or more system volumes to a storage area separate from the location of the one or more system volumes, the one or more system volumes containing operating system software that is utilized by each of the plurality of NC clients; and
- the NC client causing each of the plurality of NC clients that are subsequently booted from a network to utilize a modified operating system by modifying the working copy and replacing the one or more system volumes with the working copy on the NC server.

12. A machine-readable medium having stored thereon data representing sequences of instructions, the sequences of instructions which, when executed by a processing system, cause the processing system to perform a method comprising:
- a network computer (NC) client causing a working copy of one or more system volumes on a NC server to be created by copying the one or more system volumes to a storage area separate from the location of the one or more system volumes, the one or more system volumes containing operating system software that is utilized by each of the plurality of NC clients; and
- causing a plurality of NC clients that are subsequently booted from a network to utilize a same modified operating system by modifying the working copy and replacing the one or more system volumes with the working copy on the NC server.

13. A method comprising:
- causing each of a plurality of network computer (NC) clients that are booted from a network to utilize a single modified operating system by performing at a NC server:
- receiving a request to create a single working copy of one or more system volumes on the NC server, the one or more system volumes containing a single operating system software that is utilized by each of the plurality of NC clients;
- in response to receiving the request, creating the single working copy by copying the one or more system volumes to a storage area separate from the location of the one or more system volumes;
- receiving modifications to the single working copy;
- updating the single working copy in response to the receiving modifications; and
- replacing the one or more system volumes with the single working copy.

14. An apparatus comprising:
- a network computer (NC) server comprising a first set of one or more system volumes;
- a plurality of NC clients, wherein one of the plurality of NC clients is configured to cause each of those of the plurality of NC clients that are subsequently booted from a network to receive a second operating system that is configured differently than a first operating system in effect by replacing at the NC server a first set of one or more system volumes maintained at the NC server containing the first operating system software with a second set of one or more system volumes containing second operating system software.

15. An apparatus comprising:
- a network computer (NC) server means comprising a first set of one or more system volume means;
- a NC client means for causing a plurality of NC clients means that are subsequently booted from a network to receive a second operating system software that is configured differently than a first operating system in effect by replacing a first set of one or more system volume means maintained at the NC server containing the first operating system software with a second set of one or more system volume means containing second operating system software operating system that is configured differently that that currently in effect by replacing the one or more system volumes with one or more different system volume means.

16. A method comprising:
- causing network computer ("NC") clients that are booted from a NC server to utilize a second operating system, which is configured differently than a first operating system by performing, at a first NC client:

booting from the NC server using a first operating system, wherein the first operating system is contained in one or more system volumes on the NC server;

performing changes in a working copy of the one or more first system volumes to provide a second operating system, wherein the working copy is in a storage area separate from the location of the one or more system volumes on the NC server; and updating the one or more system volumes on the NC server after the performing changes to replace a first operating system with a second operating system, wherein the second operating system is for use by NC clients at subsequent booting from the NC server.

17. A method comprising:

causing network computer ("NC") clients that are booted from a NC server to utilize a second operating system, which is configured differently than a first operating system by performing, at the NC server:

copying one or more system volumes containing a first operating system to a storage area separate from the location of the one or more system volumes, to create a working copy;

updating the working copy in response to changes performed at a NC client, wherein the working copy after the updating contains a second operating system;

replacing the one or more system volumes with the working copy after the updating, wherein the second operating system is for use by NC clients at subsequent booting from the NC server.

18. A machine-readable medium including data that, when accessed by a machine, cause the machine to perform operations, comprising:

causing network computer ("NC") clients that are booted from a NC server to utilize a second operating system, which is configured differently than a first operating system by performing, at a first NC client;

booting from a NC server using a first operating system, wherein the first operating system is contained in one or more system volumes on the NC server;

performing changes in a working copy of the one or more first system volumes to provide a second operating system, wherein the working copy is in a storage area separate from the location of the one or more system volumes on the NC server; and updating the one or more system volumes on the NC server after the performing changes to replace a first operating system with a second operating system, wherein the second operating system is for use by NC clients at subsequent booting from the NC server.

19. A machine-readable medium including data that, when accessed by a machine, cause the machine to perform operations, comprising:

causing network computer ("NC") clients that are booted from a NC server to utilize a second operating system, which is configured differently than a first operating system by performing, at the NC server:

copying one or more system volumes containing a first operating system to a storage area separate from the location of the one or more system volumes, to create a working copy;

updating the working copy in response to changes performed at a NC client, wherein the working copy after the updating contains a second operating system;

replacing the one or more system volumes with the working copy after the updating, wherein the second operating system is for use by NC clients at subsequent booting from the NC server.

20. A network computer ("NC") client, comprising:

means for booting from a NC server using a first operating system, wherein the first operating system is contained in one or more system volumes on the NC server;

means for performing changes in a working copy of the one or more first system volumes to provide a second operating system, wherein the working copy is in a storage area separate from the location of the one or more system volumes on the NC server; and means for updating the one or more system volumes on the NC server after the performing changes to replace a first operating system with a second operating system, wherein the second operating system is for use by NC clients at subsequent booting from the NC server.

21. A network computer ("NC") server, comprising:

means for copying one or more system volumes containing a first operating system to a storage area separate from the location of the one or more system volumes, to create a working copy;

means for updating the working copy in response to changes performed at a NC client, wherein the working copy after the updating contains a second operating system;

means for replacing the one or more system volumes with the working copy after the updating, wherein the second operating system is for use by NC clients at subsequent booting from the NC server.

* * * * *